United States Patent
Naenko et al.

(10) Patent No.: US 10,496,547 B1
(45) Date of Patent: Dec. 3, 2019

(54) EXTERNAL DISK CACHE FOR GUEST OPERATING SYSTEM IN A VIRTUALIZED ENVIRONMENT

(71) Applicant: Parallels International GmbH, Schaffhausen (CH)

(72) Inventors: Andrey Naenko, Moscow (RU); Nikolay Dobrovolskiy, Moscow (RU); Serguei M. Beloussov, Costa Del Sol (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 59 days.

(21) Appl. No.: 15/591,225

(22) Filed: May 10, 2017

(51) Int. Cl.
*G06F 12/0873* (2016.01)
*G06F 3/06* (2006.01)
*G06F 12/0804* (2016.01)

(52) U.S. Cl.
CPC ........ *G06F 12/0873* (2013.01); *G06F 3/0604* (2013.01); *G06F 3/064* (2013.01); *G06F 3/0653* (2013.01); *G06F 3/0659* (2013.01); *G06F 3/0665* (2013.01); *G06F 3/0685* (2013.01); *G06F 12/0804* (2013.01); *G06F 2212/152* (2013.01); *G06F 2212/224* (2013.01); *G06F 2212/608* (2013.01)

(58) Field of Classification Search
CPC .................................................. G06F 12/0873
USPC ........................................................ 711/102
See application file for complete search history.

(56) References Cited

U.S. PATENT DOCUMENTS

| | | | | |
|---|---|---|---|---|
| 7,596,677 B1 * | 9/2009 | Koryakin | ............ | G06F 12/1036 711/206 |
| 2011/0138147 A1 * | 6/2011 | Knowles | ............... | G06F 9/5016 711/170 |
| 2011/0265083 A1 * | 10/2011 | Davis | .................. | G06F 12/0866 718/1 |
| 2014/0059292 A1 * | 2/2014 | Phelan | ................ | G06F 12/0866 711/113 |
| 2016/0147657 A1 * | 5/2016 | Jiang | ................... | G06F 9/45558 711/118 |

* cited by examiner

*Primary Examiner* — Gautam Sain
(74) *Attorney, Agent, or Firm* — Arent Fox LLP; Michael Fainberg

(57) ABSTRACT

A system and method is provided for managing computing resources of a physical server executing a plurality of virtual machines (VMs) including a first virtual machine (VM). The first VM executes a guest block device driver configured to provide a guest operating system of the first VM an interface to a memory-mapped virtual storage device. A virtual machine monitor maintains a disk cache associated with the virtual storage device. The disk cache resides in a host physical memory of the physical server outside of portions of the host physical memory associated with guest physical memory of the first VM. The virtual machine monitor is configured to, responsive to determining that available host physical memory satisfies a threshold condition, reclaim a target portion of the host physical memory allocated to the disk cache.

20 Claims, 6 Drawing Sheets

EXTERNAL DISK CACHE FOR GUEST OPERATING SYSTEM IN A VIRTUALIZED ENVIRONMENT

TECHNICAL FIELD

The present disclosure relates generally to managing virtualized computing system resources, and, more particularly, to a system and method for managing an external disk cache for a guest operating system in a virtualized environment.

BACKGROUND

With virtual machine technology, a user can create and run multiple operating environments on a server at the same time. Each operating environment, or virtual machine, requires its own "guest" operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

Physical server systems, or hosts, which run multiple virtual machines (VMs) can sometimes face a lack of physical memory (e.g., RAM) due to the common practice known as memory over-commitment in which several VMs are run that have a total amount of memory in their configurations that exceeds the host's actual memory size. When there is little to no free memory left in the host system, the virtualization layer that controls execution of the virtual machines (e.g., hypervisor, virtual machine monitor) needs to free some memory, typically memory allocated to one or more of the running VMs. Otherwise, the host may suffer severe penalties in its performance in the form of stuttering, thrashing, complete lock-up, and so forth.

In some existing approaches, the virtualization layer can attempt to selectively free guest memory of one or more VMs, such as the unused guest memory from an idle VM. However, the virtualization layer has to decide carefully which parts of guest memory to free because guest system performance can be sensitive to such decisions. In one approach, a virtualization layer may try to free guest memory on a least recently used (LRU) basis, which the virtualization layer may try to determine by continuously collecting memory access statistics. However, statistics collection adds performance overhead and requires additional memory to store and process. Furthermore, such an approach is generally probabilistic and cannot definitively determine that the freed guest memory is not being used by the virtual machine.

Another approach to memory management is memory ballooning. A special balloon driver installed in the guest operating system "inflates" its memory use by allocating pages of guest physical memory, and signals to the virtualization layer which particular regions of memory were given to the driver by the guest operating system. The virtualization layer then frees those regions in memory, which the system now knows is not used by any guest except the balloon driver. However, the ballooning technique requires some time to take action, often reacting too slowly to the system's state. Further, the balloon driver is unable to identify situations in which it would be better to stop taking memory from a guest system.

SUMMARY

Thus, a system and method is disclosed herein for managing computing resources in a virtualized environment, and, more particularly, for management of an external disk cache for a guest operating system in a virtualized environment.

According to an exemplary aspect, a method for managing computing resources of a physical server executing a plurality of virtual machines (VMs). The method includes executing, in a first virtual machine (VM) of the plurality of VMs, a guest block device driver configured to provide an interface to a memory-mapped virtual storage device. The method further includes maintaining, by a virtual machine monitor, a disk cache associated with the virtual storage device. The disk cache resides in a host physical memory of the physical server outside of portions of the host physical memory associated with guest physical memory of the first VM. The method includes, responsive to determining that available host physical memory satisfies a threshold condition, reclaiming a target portion of the host physical memory allocated to the disk cache.

In one example aspect, the memory-mapped virtual storage device occupies guest physical memory of the first VM.

According to another example aspect, the disk cache is configured to store pages from a physical storage device of the physical server, and wherein the disk cache is shared between the plurality of VMs.

According to another example aspect, maintaining by the virtual machine monitor the disk cache associated with the virtual storage device includes intercepting, by the virtual machine monitor, a disk operation issued by the guest block device driver for the virtual storage device, wherein the disk operation comprises at least one of a read operation and a write operation.

According to another example aspect, maintaining by the virtual machine monitor the disk cache associated with the virtual storage device further includes mapping a portion of the disk cache into guest physical address space of the first VM, restarting the intercepted disk operation such that the disk operation runs natively on the virtual storage device.

According to another example aspect, maintaining by the virtual machine monitor the disk cache associated with the virtual storage device includes intercepting, by the virtual machine monitor, a read operation issued by the guest block device driver for data from a specified area in the virtual storage device, retrieving the data from a physical storage device and storing the data in a portion of the disk cache, mapping the portion of the disk cache into a guest physical address space of the first VM, and restarting the intercepted read operation such that the read operation executes natively on the virtual storage device to read the data from the specified area in the virtual storage device that is mapped to the disk cache.

According to another example aspect, maintaining by the virtual machine monitor the disk cache associated with the virtual storage device includes intercepting, by the virtual machine monitor, a write operation issued by the guest block device driver for storing data to a specified area in the virtual storage device mapping a portion of the disk cache into guest physical address space of the first VM; and restarting the intercepted write operation such that the write operation executes natively on the virtual storage device to write the data to the specified area in the virtual storage device that is mapped to the disk cache.

According to another example aspect, reclaiming a target portion of the host physical memory allocated to the disk cache includes determining that cached data contained in the target portion have been modified, (i) flushing the cached data to a physical storage device, and (ii) un-mapping the target portion from a guest physical address space of the first VM.

In one further exemplary aspect, a system is provided for managing computing resources of a physical server executing a plurality of virtual machines (VMs). In this aspect, the system includes a host physical memory; a first virtual machine (VM), and a virtual machine monitor. The first VM includes guest physical memory, a guest block device driver, and a memory-mapped virtual storage device. The guest device driver is configured to provide an interface to the memory-mapped virtual storage device. The virtual machine monitor is configured to maintain a disk cache associated with the virtual storage device. The disk cache resides in the host physical memory outside of portions of the host physical memory associated with guest physical memory of the first VM. The virtual machine monitor is further configured to, responsive to determining that available host physical memory satisfies a threshold condition, reclaim a target portion of the host physical memory allocated to the disk cache.

According to another exemplary aspect, a computer-readable medium is provided comprising instructions that comprises computer executable instructions for performing any of the methods disclosed herein.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
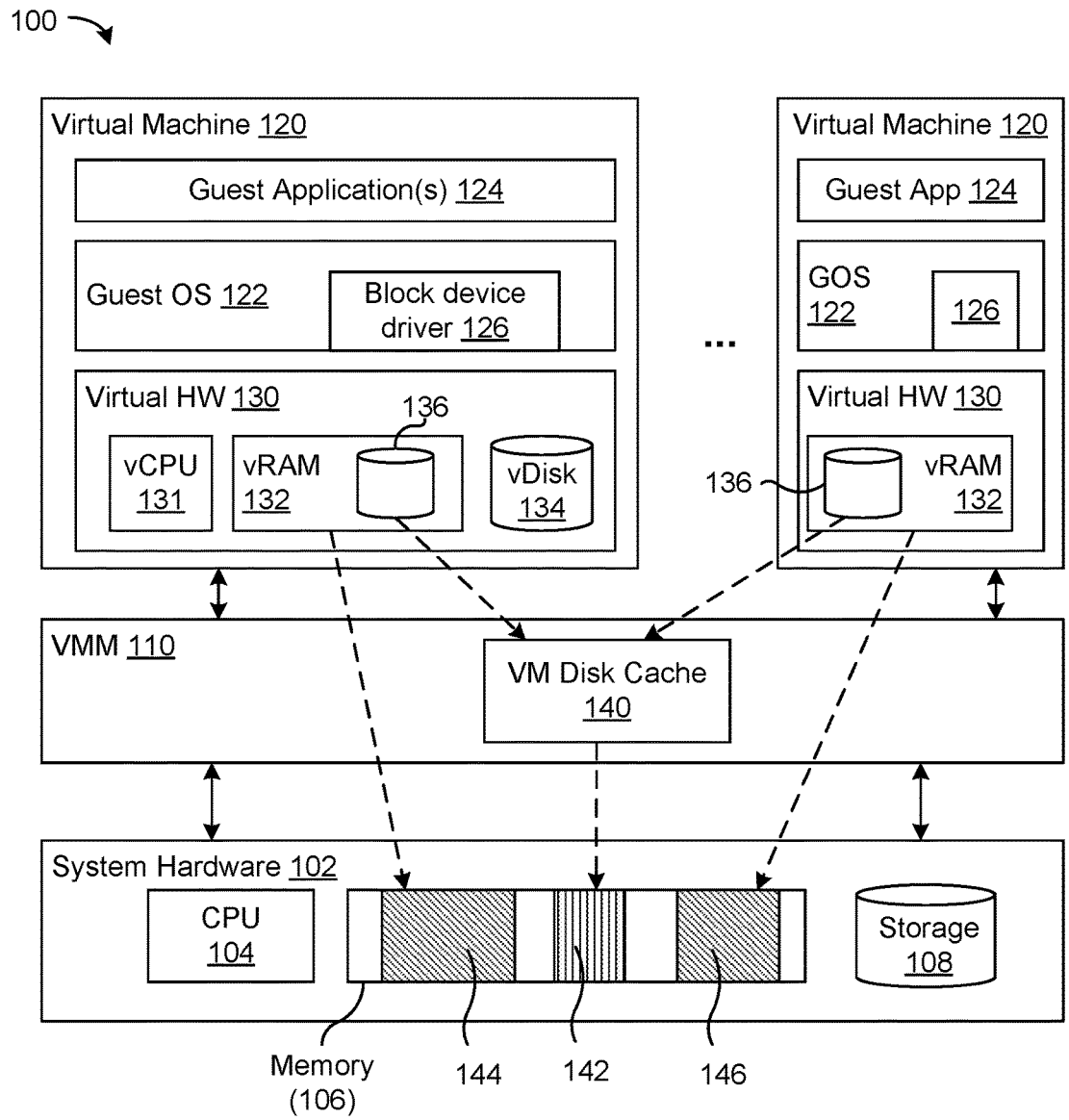
FIG. 1 illustrates a block diagram of a system for managing a guest operating system disk cache according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described above, in situations where there is little to no free memory available in a host system, the virtualization layer must carefully select which parts of guest physical memory to free because guest system performance can be severely and negatively affected by such decisions. It has been determined that guest operating system performance can degrade greatly when the virtualization layer frees memory occupied by guest programs' code and data, but degrades less when the virtualization layer frees memory occupied by guest disk caches. A disk cache is a cache in memory for holding data such as files and executable programs originating from a secondary storage device (e.g., a hard disk), which can result in quicker access to disk data and other performance improvements. However, one of the main challenges for the virtualization layer is to be able to distinguish guest disk cache memory from guest program and data memory because conventional (guest) operating systems, such as Microsoft Windows®, do not provide information about the operating system uses memory.

According to an exemplary aspect, a system and method is provided to bypass a traditional guest disk cache and implement disk caching external to the guest operating system of a virtual machine. As such, using the described system and method, a virtual machine monitor (VMM) is able to effectively manage the disk cache for virtual machines, for example, by reclaiming memory used by the external disk cache rather from memory used by the guest program code and data. As will be described in greater detail below, the described system includes, on the guest side, a filesystem or block device driver configured to provide the guest operating system with an interface to a memory-mapped virtual storage device. When a user-level application in the guest system access data on the virtual storage device, the driver reads or writes appropriate areas of the virtual storage area. The described system further includes, on the host side, a VMM-controlled cache between the guest system and a real (i.e., physical) persistent storage device. The VMM intercepts the read and write operations issued by the guest device driver, maps chunks of cache into the guest physical address space, and restarts the operation. As that data is now mapped, the operation executes natively without the need for VMM intervention.

FIG. 1 illustrates a block diagram of a system 100 for managing a guest operating system disk cache according to an exemplary aspect. As shown, the system generally includes one or more virtual machines 120 can be created on a host platform (generally shown as system 100) that includes system hardware 102 and a virtual machine monitor 110 (also known as a hypervisor or a virtualizer). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102.

The system 100 may be a physical server, host, computer server, desktop, laptop, handheld device, or any other electronic device sufficient for implementing virtualization as described herein. As shown, the system hardware 102 of a host can include a computer processing unit (CPU) 104, memory 106 (e.g., random access memory), and storage devices 108 (e.g., hard disk drives). The system 100 may include additional devices, software modules, and the like, as would be appreciated to one skilled in the art, but are not shown herein so as to not unnecessarily obscure the aspects of the disclosure. As software, the code for the VM 120 will typically execute on the actual system hardware 102.

In the exemplary aspect, the virtual machine 120 has both virtual system hardware 130 and guest system software, including the guest OS 122. The virtual system hardware 130 can include a virtual CPU 131, virtual memory 132, a virtual disk 134, as well as other virtual hardware components, such as a virtual network interface (not shown), and the like. It is noted that all of the virtual hardware components of the virtual machine 120 can be implemented in software to emulate corresponding physical components, as would be appreciated to on skilled in the art.

For example, the guest physical memory 132 of the virtual machine 120 is backed by the corresponding host physical memory 106 in system hardware 130. For clarity of discussion, the term "guest physical memory" or "guest OS memory" refers to emulated memory (e.g., virtual memory 132) that is visible to the guest OS 122. In contrast, the term "guest virtual memory" refers to a virtual address space exposed to guest applications 124 and provided by the guest OS 122 as a memory management technique that uses disk storage to extend physical memory. The term "host physical memory" refers to hardware memory (e.g., memory 106) that is visible from the perspective of the VMM 110. Discussion of "host virtual memory" has been omitted for clarity of explanation, but it is understood that the host itself may use virtual memory techniques to expose a continuous virtual address space to the VMM and/or host operating system of the host.

The VMM 110 acts as the interface between guest software executing within the VM 120, including one or more guest applications 124 and guest OS 122, and the hardware components and devices in the underlying system hardware platform 102 of the host machine. For example, to manage memory during operation of the VM 120, when an user-level application (e.g., guest application 124) requests a page of memory, the guest OS 122 allocates memory in an address space of the guest physical memory 132. The address space of guest physical memory 132 will be mapped to another memory address space of the host physical memory 106 of the system hardware 130. In this regard, the VMM 110 can maintain a paging structure, including one or more page tables or translation tables, such as the exemplary page mapping shown U.S. Pat. No. 7,596,677, the entire contents of which are hereby incorporated by reference.

According to one exemplary aspect, virtual machine 120 includes a memory-mapped virtual storage device 136 and a block device driver 126 executed by the guest OS 122. In one exemplary aspect, the virtual storage device 136 may be configured as a memory-mapped file having a byte-for-byte correlation with a segment of the guest virtual memory. Locations in the virtual storage device 136 may be mapped to corresponding locations in the guest physical memory 132. The virtual storage device may be configured to be referenced by the guest OS 122 through a file descriptor but treated as if part of guest physical memory 132. In some exemplary aspects, the virtual storage device 136 may occupy a portion of host physical memory 106, or other component of the system hardware 102, such as a part of PCI (Peripheral Component Interconnect) configuration space. The virtual storage device 136 may be configured to store data and executable code for guest applications 124 and operating system 122, similar to virtual disks 134, or any other data as requested by the guest applications 124 and the guest OS 122.

The block device driver 126 may be configured to provide guest OS 122 with an interface to a virtual storage device 136. When a guest application 124 accesses data stored on the virtual storage device 136, the block device driver 126 reads or writes appropriate areas of the virtual storage device 136. As described in greater detail below, the VMM 110 may be configured to transparently load parts of the virtual storage device in the VM's guest physical memory as the block device driver 126 attempts to access them.

In some exemplary aspects, the block device driver 126 may be implemented as a driver program installed on the guest operating system 122 and configured to handle system calls for accessing the file descriptor linked to the virtual storage device 136. In other exemplary aspects, the functionality of the block device driver 126 may be implemented as part of a filesystem, a filesystem module, a kernel module, or other component of the guest environment in the VM 120. In this way, exemplary aspects for managing a disk cache external to the guest operating system 122 may be implemented without needing to modify the guest operating system 122 itself (beyond installation of the block device driver 126).

It is understood that the various implementations of the block device driver 126 and the virtual storage device 136 can be used depending on the semantics of a particular guest operating system 122. For example, in cases where the guest operating system 122 is Linux® or other Unix-like operating systems, the block device driver 126 and virtual storage device 136 may be implemented as a temporary file storage facility, such as tmpfs, which appears as a mounted file system but is not backed by a persistent storage device, but rather, memory. The block device driver 126 may be configured to report to the VMM 110 which memory areas the disk cache uses to store data, and handles dynamically allocating memory for the data being put into the temporary file storage facility. In another example, in cases where the guest operating system 122 is Windows®, the particular guest operating system may require a block device to put a native filesystem (e.g., NTFS) on. In this case, there may not be any available information from the filesystem layer. As such, the VMM 110 should be configured to provide a virtual block device at some known physical address, so the VMM 110 knows where data is located.

According to one exemplary aspect, the VMM 110 may maintain a VM disk cache 140 between the guest operating system 122 and the physical storage 108 backing the virtual storage device 136. In one exemplary aspect, the VM disk cache 140 may be stored in host physical memory 106 of the system's physical hardware 102. The VM disk cache 140 may be configured to cache the data residing on the physical storage devices that correspond to the virtual storage device 136, thereby reducing the number of disk reads and, consequently, disk latency. In some exemplary aspects, the VM disk cache 140 may store data of files and executable programs, or pages of data from guest virtual memory of a VM 120. In some exemplary aspects, the VM disk cache 140 may be shared amongst the plurality of virtual machines 120 managed by the VMM 110. In other exemplary aspects, the VMM 110 may manage a separate VM disk cache for each virtual machine 120 executing on the host.

As shown in FIG. 1, the guest data contained within regions 144 and 146 in RAM corresponding to the guest physical memory of the VMs is considered opaque from the perspective of the VMM 110. In one exemplary aspect, the VMM 110 is configured to maintain the VM disk cache 140 in portions of the host physical memory separate from those portions holding the guest physical memory 132 of a VM. In this way, the VMM 110 is able to distinguish between memory used for guest disk cache and memory used for guest program and data during situations where memory needs to be freed from VMs 120. For example, as shown in FIG. 1, the VM disk cache 140 is maintained in a region 142 of the host physical memory 106 that is separate from the region 146 backing the guest physical memory of another VM, and even separate from the region 144 backing the guest physical memory from the same VM 120. The illustrated memory regions in the host physical memory 106 are depicted as contiguous regions for clarify of illustration only, and it is understood that portions of memory for guest physical memory 132 and for the VM disk cache 140 may be non-contiguous blocks or fragmented chunks distributed across the host physical memory 106.

In one exemplary aspect, the VMM 110 may be configured to intercept one or more disk operations on the virtual storage device 136 and use the VM disk cache 140 to service the intercepted disk operation. For example, the VMM 110 may intercept read and write operations issued by the block device driver 126 in the guest VM and map portions of the VM disk cache 140 into the guest physical address space of the VM 120 as needed to fulfill the operation, the details of which are described in greater detail below. In some exemplary aspects, the VMM 110 is configured to register with the guest operating system 122 to handle access violations (similar to page faults except control is transferred to the VMM 110 not the guest OS kernel) associated with the guest physical memory, and in particular, the guest physical memory mapped to the virtual storage device 136. The VMM 110 may instantiate, update, and maintain one or more data structures to facilitate mapping and translating locations in the VM disk cache 140 to the guest physical memory of the VM 120, including such as page tables, shadow page tables, trees, hash tables, and other data structures.

In one exemplary aspect, the VMM 110 may implement a write-through cache management policy in which writes are performed synchronously both to the VM disk cache 140 (cache) and to physical storage 108 (backing store). In another exemplary aspect, the VMM 110 may implement a write-back cache management policy, sometimes also referred to as a write-behind policy, in which write operations are performed on the VM disk cache 140 initially. In this aspect, the VMM 110 delays writing on the backing storage (i.e., physical storage 108) until the blocks of VM disk cache 140 containing data are going to be modified or replaced with different values. It is understood that the VMM 110 may be configured to use other suitable cache management policies.

In general, the term "module" as used herein can refer to a software service or application executed as part of the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 2:
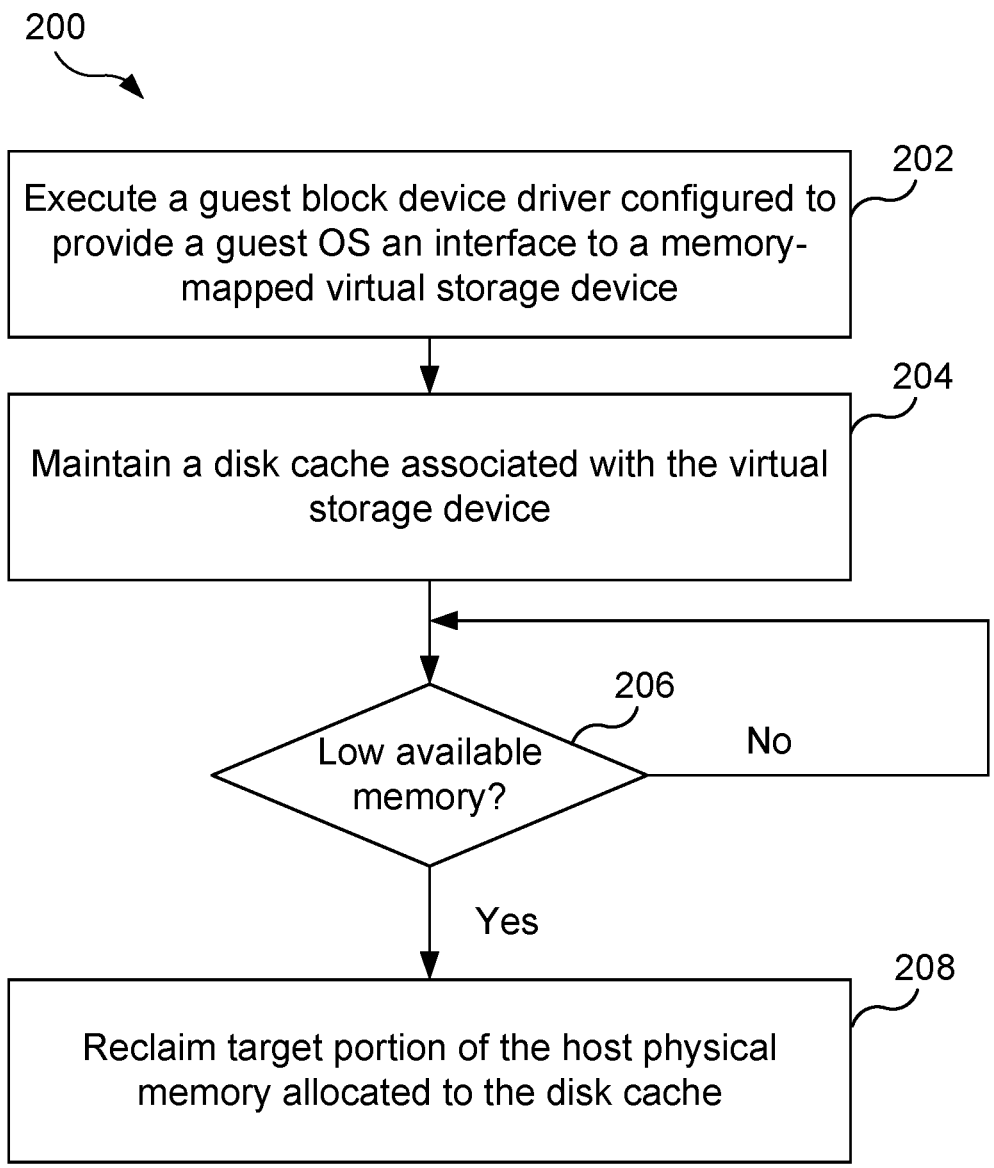
FIG. 2 illustrates a flowchart for a method for managing computing resources of a physical server executing a plurality of virtual machines according to an exemplary aspect.

FIG. 2 illustrates a flowchart of a method 200 for managing computing resources of a physical server executing a plurality of virtual machines (VMs) according to an exemplary aspects. It is noted that the following description of the exemplary method makes reference to the system and components described above.

As shown, initially at step 202, a first VM 120 executes a guest block device driver (e.g., block device driver 126) configured to provide a guest operating system 122 of the first VM 120 an interface to a memory-mapped virtual storage device 136. In some exemplary aspects, the memory-mapped virtual storage device 136 occupies guest physical memory 132 of the first VM 120.

In one exemplary aspect, during operations, the block device driver 126 may attempt to access a page in memory-mapped virtual storage device 136 that, from the perspective of the VM 120, is believed to be mapped into linear space, however in reality, that page may be marked as "not present", and therefore absent in paging translation. This triggers an access violation, throwing control to the VMM 110, which is configured to handle the access violation associated with the virtual storage device 136.

At step 202, the VMM 110 maintains a disk cache (e.g., VM disk cache 140) associated with the virtual storage device 136. The disk cache resides in a host physical memory (e.g., memory 106) of the physical server (e.g., host 100) outside of portions of the host physical memory associated with the guest physical memory 132 of the first VM. In some exemplary aspects, the disk cache 140 is configured to store pages from a physical storage device 108 backing the virtual storage device 136. In some exemplary aspects, the disk cache is shared between the plurality of VMs 120 executing on the host.

In some exemplary aspects, during operations, the VMM 110 may intercept a disk operation (e.g., read, write) issued by the guest block device driver 126 for the virtual storage device 136. The VMM 110 may map a portion of the disk cache (e.g., VM disk cache 140) into guest physical address space of the VM, and restart the intercepted disk operation such that the disk operation runs natively on the virtual storage device, i.e., without interception from the VMM 110. The described operations for maintaining the VM disk cache are described in greater detail below in conjunction with FIG. 3.

At step 206, the VMM 110 may monitor the performance of the host and determine whether available host physical memory satisfies a threshold condition. For example, VMM 110 may determine the available host physical memory is less than a predetermined amount of memory as a unit value (e.g., less than 500 MB of RAM) or as a percentage (e.g., less than 1% of total host physical memory). In another example, the VMM 110 may compare the total host physical memory consumed by the plurality of VMs 120 to a threshold amount of memory.

At step 208, responsive to determining that available host physical memory satisfies the threshold condition, the VMM 110 reclaims a target portion of the host physical memory allocated to the disk cache. In some exemplary aspects, if the VMM 110 determines that the cached data being evicted is unmodified, the VMM 110 may un-map it from the guest physical address space and de-allocate the memory used by the VM disk cache 140. Conversely, responsive to determining that cached data contained in the target portions have been modified (i.e., dirty pages), the VMM 110 may flush the cached data to the physical storage device 108, un-map the target portions of the VM disk cache 140 from the guest physical address space of the first VM, and de-allocate the memory used by the VM disk cache 140. The VMM 110 may re-allocate the freed host physical memory for other uses, including use by another VM besides the first VM.

In some exemplary aspects, the VMM 110 may select specific portions of the VM disk cache 140 in order to free up the host physical memory backing those specific portions of the VM disk cache, e.g., pages from a particular VM's disk cache, pages from multiple VM's disk cache, an entire disk cache for a particular VM, etc. VMM 110 may use any number of cache management and cache replacement policies to select which portions to evict from the VM disk cache to free up memory, such as Least Recently Used (LRU), First In First Out (FIFO), etc. In some exemplary aspects, the VMM 110 may use a cache replacement policy that based not just on the particular items stored in the VM disk cache, but further based on the characteristics of the individual VMs storing that item and that share the VM disk cache 140. For example, the VMM 110 may select for eviction pages in the VM disk cache 140 from a particular VM (over pages from other VMs) on the basis that the particular VM is less frequently used or has a lower priority than the other VMs executing on the host.

Accordingly, exemplary aspects of present disclosure advantageously frees memory from a guest system without needing to let the guest system execute some code (e.g., ballooning driver code) first. As a result, this effectively decreases memory manager latency and reduces the risk of system lockup in the physical server. The exemplary aspects of the present disclosure are able to bypass the storage stack of the guest operating system inside the guest VM which traditionally manages a disk cache for the guest.

As described earlier, if the cached data evicted from the VM disk cache 140 has not been modified, the VMM 110 can quickly un-map it from the guest physical address space and de-allocate, which is a faster operation than conventional techniques because there is no I/O operations. If the cached data is modified, the VMM 110 can flush the cached data before de-allocating the memory, which is still more efficient than waiting for a conventional guest balloon inflation or risking to free memory that contains guest code or data.

Figure 3:
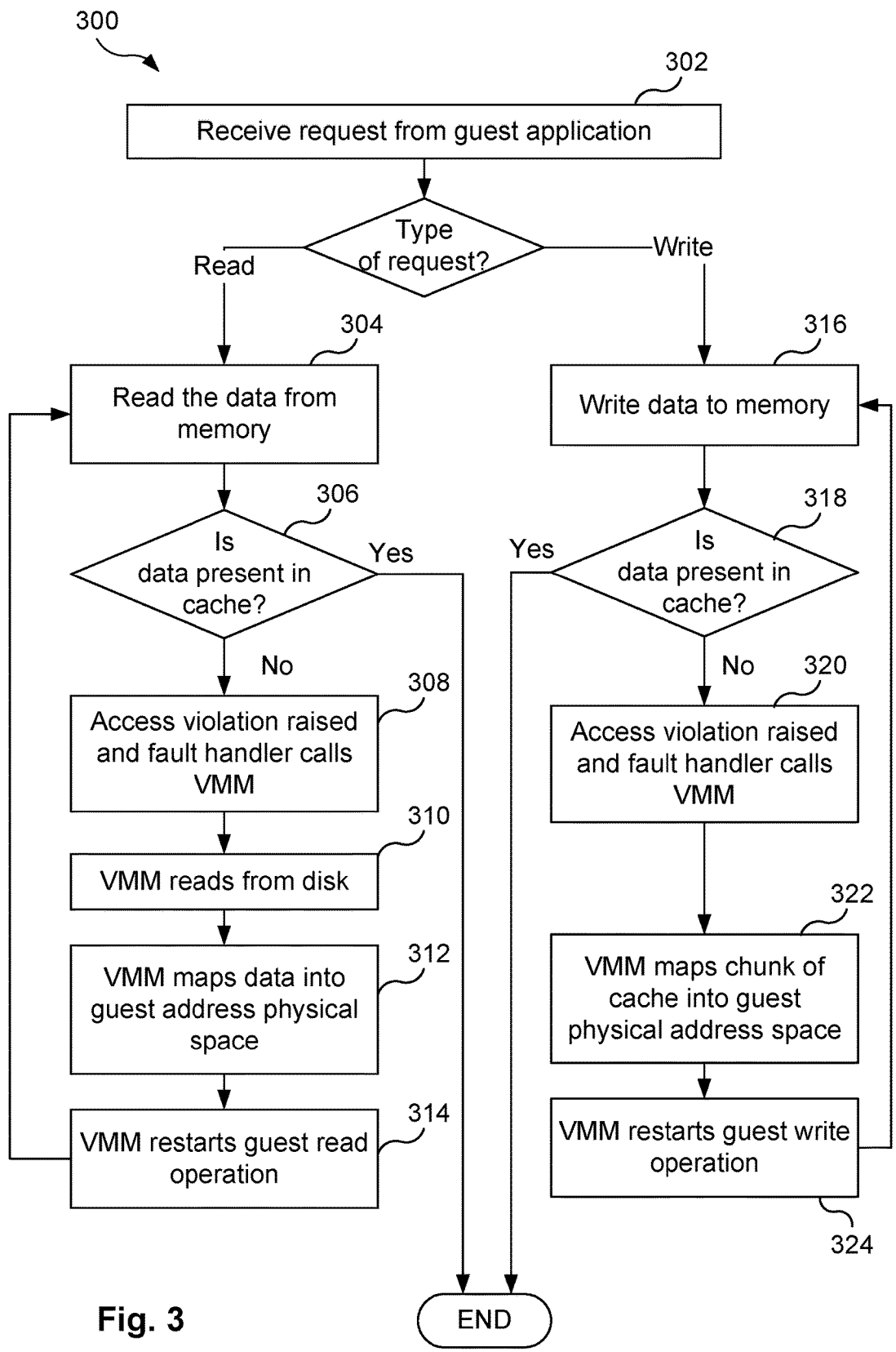
FIG. 3 illustrates a flowchart for a method for maintaining a guest operating system disk cache according to an exemplary aspect.

FIG. 3 illustrates a flowchart of a method 300 for maintaining a guest operating system disk cache according to an exemplary aspects. It is noted that the following description of the exemplary method makes reference to the system and components described above.

As shown in FIG. 3, initially at step 302, the guest block device driver 126 receives a disk operation for the virtual storage device 136 from an application (e.g., guest application 124) or the guest operating system 122 executing in a first VM. In some exemplary aspects, the disk operation may be a read operation to retrieve data from a specified area in the virtual storage device 136, or a write operation to store data to a specified area in the virtual storage device 136.

If the received request is a read operation, at step 304, the guest block device driver 126 attempts to read requested data from a location in guest physical memory mapped to the specified area in the memory-mapped virtual storage device 136. That is, the block device driver 126 may issue a read operation for guest data located at a guest physical address that is supposed to contain the guest data for the memory-mapped virtual storage device. In situations in which the particular guest data is (already) present in the VM disk cache (e.g., the "YES" branch of block 306), then the block device driver 126 successfully in retrieves the guest data, and returns the requested data to the component that issued the read request (e.g., guest application 124).

However, in situations in which the requested guest data is not present in the VM disk cache (e.g., the "NO" branch of block 306), then the block device driver's attempt to access the guest physical address mapped to the virtual storage device 136 causes the guest OS 122 to raise an access violation indicating that the portion of the virtual storage device 136 is not currently mapped. At step 308, in response to the page fault, a fault handler of the guest OS 122 calls the VMM 110 to intervene and intercept the read operation issued by the guest block device driver.

At step 310, the VMM 110 retrieves the guest data from the physical storage device 108 and stores the guest data in a portion of the VM disk cache 140. In some exemplary aspects, the VMM 110 determines a storage address (e.g., logical block address) in the physical storage device 108 that backs the VM disk cache 140 and retrieves the guest data from that storage address.

At step 312, the VMM 110 maps the portion of the disk cache into a guest physical address space of the first VM. In some exemplary aspects, the VMM 110 maps a host physical address associated with the VM disk cache 140 to a guest physical address within the guest physical memory associated with the first VM.

At step 314, the VMM 110 restarts the intercepted read operation, such that the read operation executes natively on the virtual storage device to read data from the specified area in the virtual storage device that is mapped to the disk cache. It is understood that translation from guest physical addresses to host physical addresses can be hardware-assisted, for example by a memory management unit (MMU). As described earlier, the VMM 110 may control one or more translation tables (e.g., shadow page tables). The VMM 110 can add and remove entries to the translation tables that map guest physical addresses into host physical addresses. When the hardware of the host needs to translate an address, the hardware looks up an association in those tables maintained by the VMM 110. If there is no entry, the hardware interrupts guest code execution (e.g., guest application 124) and transfers control to the VMM 110. The VMM adds translation entry into the table and restarts operation. Now that an entry exists, the hardware can perform the address translation without VMM intervention. In this way, the disk operation executes "natively" because the disk operation executes without transferring control to the VMM 110.

As shown in FIG. 3, the operations loop back to step 304, in which the block device driver 126 re-attempts to read the requested data from the location in the guest physical memory that is (now) mapped to the specified area in the memory-mapped virtual storage device 136. As the requested guest data is now present in the VM disk cache, the read operation should complete successfully, and the read guest data is returned to the guest application 124.

If the received request is a write operation, the guest block device driver 126 attempts to write the requested data to a location within guest physical memory mapped to an area in the memory-mapped virtual storage device 136. In some exemplary aspects, the block device driver 126 may issue a write operation for storing guest data to a specified area in the virtual storage device.

In situations in which existing guest data at the specified area is already present in the VM disk cache (e.g., the "YES" branch of block 318), then the block device driver 126 successfully writes the guest data, and returns a success status to the guest application 124 that issued the write request. In one exemplary aspect implementing a write-through cache policy, the guest block device driver 126 writes the guest data to the mapped area (i.e., into the VM disk cache), and signals to the VMM 110 to write the guest data to the underlying backing store (e.g., physical storage 108). In another exemplary aspect implementing a write-back cache policy, the guest block device driver 126 writes the guest data to the mapped area only (i.e., into the cache only), and the VMM 110 is configured to update the physical storage device 108 only when evicting blocks from the VM disk cache containing the VM's guest data.

In situations in which the existing guest data at a specified area in the virtual storage device is not present, then the block device driver's write attempt causes the guest OS to raise a page fault. At step 320, in response to the access violation, the fault handler of the guest OS 122 calls the VMM 110 to intervene and intercept the write operation issued by the guest block device driver. At step 322, the VMM 110 maps a portion of the disk cache into guest physical address space of the first VM. In some exemplary aspects, the VMM 110 maps a host physical address associated with the VM disk cache to a guest physical address within the guest physical memory associated with the first VM.

At step 324, the VMM 110 restarts the intercepted write operation, such that the write operation executes natively on the virtual storage device to write the data to the specified area in the virtual storage device that is mapped to the disk cache. As shown in FIG. 3, the operations return to step 316, in which the block device driver 126 re-attempts to write the guest data to a location in the guest physical memory that is now mapped to the specified area in the memory-mapped virtual storage device 136. As an allocated chunk is now present in the VM disk cache, the write operation should complete successfully, and the control is returned to the guest application 124 with a successful status.

Figure 4B:
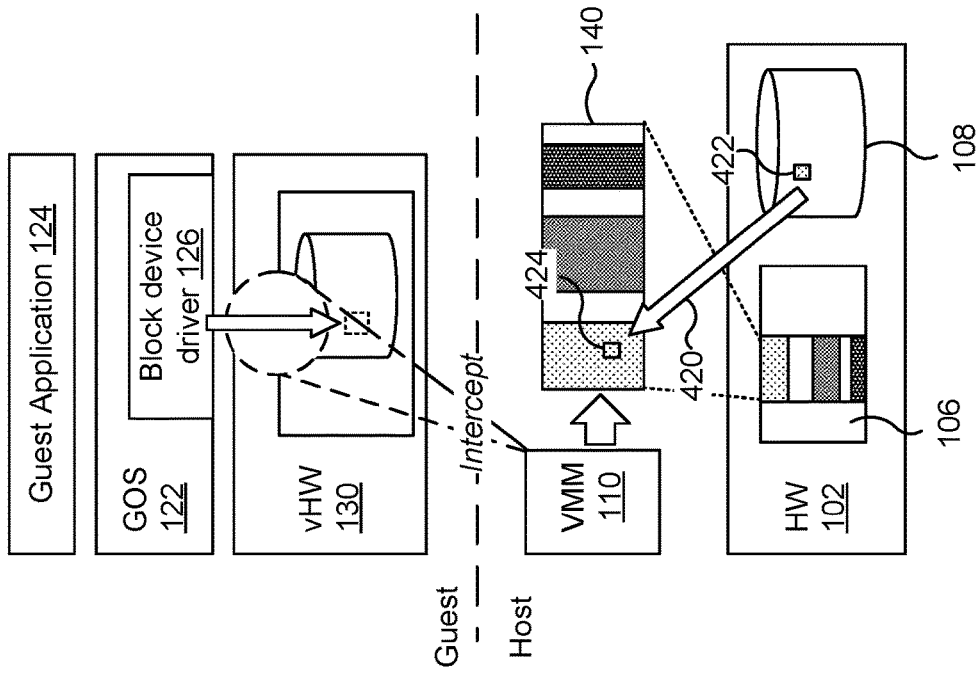
FIGS. 4A to 4D illustrates operations for managing a guest operating system disk cache according to an exemplary aspect.
Figure 4A:
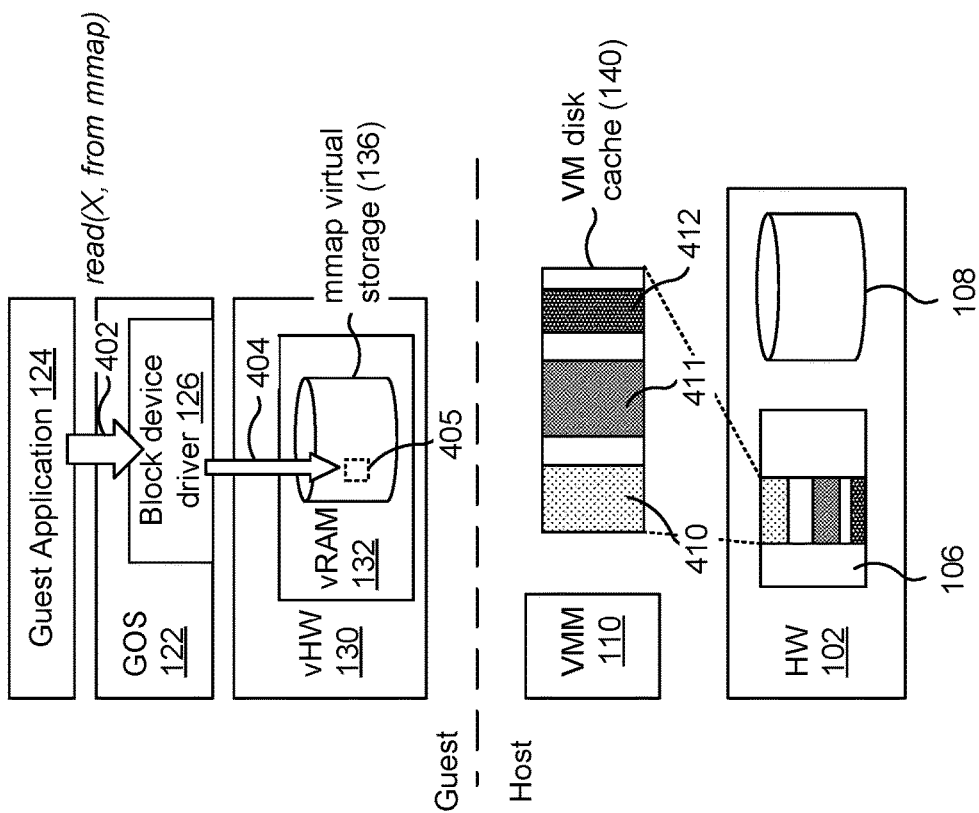

FIGS. 4A-4D are block diagrams illustrating operations for managing a guest operating system disk cache according to an exemplary aspect. FIG. 4A depicts a virtual machine monitor (e.g., VMM 110) managing a disk cache (e.g., VM disk cache 140) external to the guest operating system 122 of a VM. The VM disk cache 140 depicted is storing guest data in respective portions 410, 411, and 412 of host physical memory 106 for a plurality of VMs executing in the host system. The portion 410 in the VM disk cache 140 is associated with a memory-mapped virtual storage device (e.g., virtual storage device 136).

As shown, a guest block device driver (e.g., block device driver 126) receives a read request 402 (e.g., "read(X, from mmap)") from the guest application to retrieve guest data from a specified area "X" from the virtual storage device. In turn, the block device driver issues a read operation (represented by operation 404) to attempt to read a location in guest physical memory (e.g., location 405) that corresponds and maps to the specified area "X" according to suitable memory-mapping techniques. As shown, the desired guest data is not in fact present in the location 405 of guest physical memory, and the attempted access raises an access violation. It is noted that execution of the read operation 404 attempts to just read the guest physical memory without expressly checking whether a cache (e.g., VM disk cache) contains the data, in contrast to conventional page cache techniques which first check a cache (e.g., for a cache hit or miss) before proceeding to the backing store.

As shown in FIG. 4B, the VMM 110 is called by the fault handler to intercept the block device driver's read request 402. The VMM retrieves one or more data blocks 422 from the physical storage device 108 associated with the specified area "X". The VMM stores the retrieved data blocks in a chunk 424 of the VM disk cache 140 (as represented by operation 420).

Figure 4D:
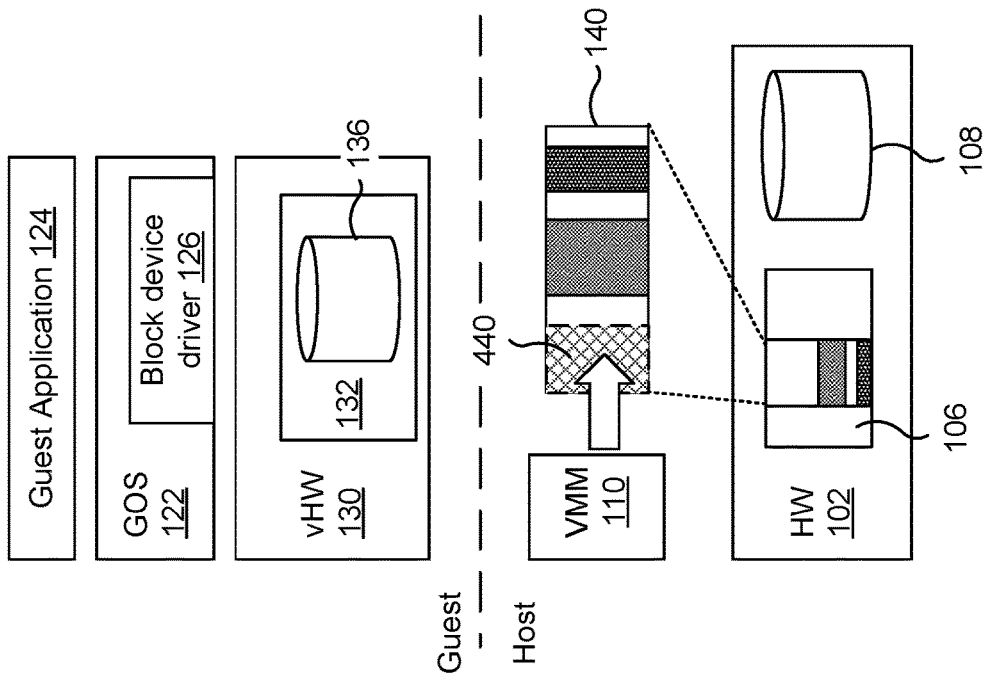
Figure 4C:
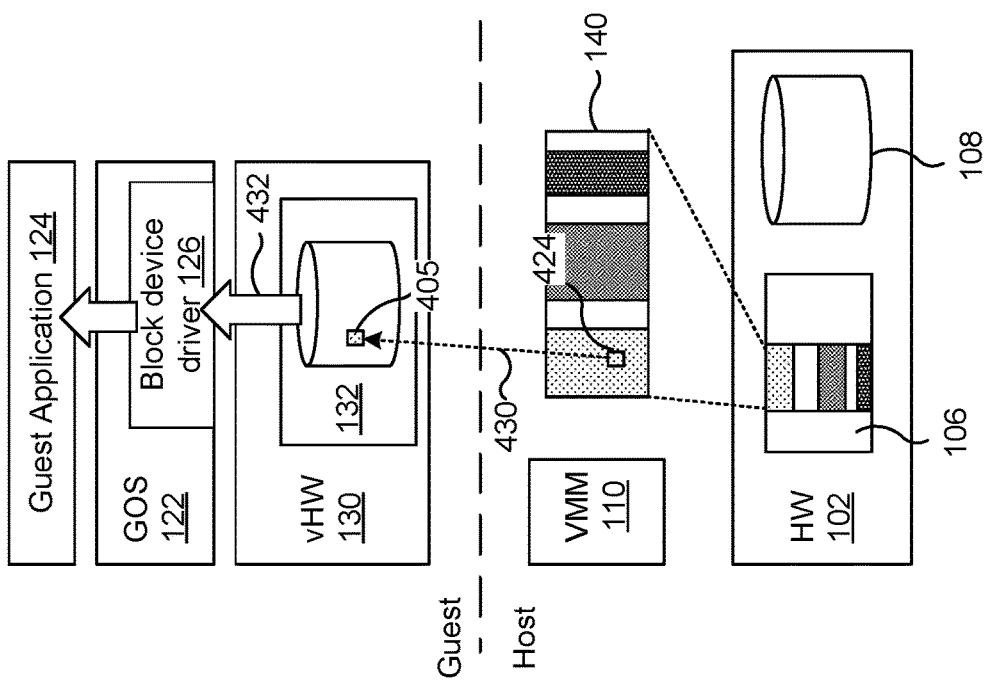

As shown in FIG. 4C, the VMM 110 maps the appropriate chunk 424 of the VM disk cache in the location 405 within VM's guest physical memory 132. As shown, the mapping 430 (represented by arrow 430) translates a portion of the VM disk cache into the guest physical address space of the VM and into the memory-mapped virtual storage device 136. The VMM 110 replays the read operation (represented by arrow 432), and the guest block device driver reads the requested data from the location 405 of the memory-mapped virtual storage device 136, which is now mapped to the chunk 424 of the VM disk cache. The block device driver returns the guest data to the guest application.

FIG. 4D depicts operations of the VMM 110 that free up memory from the host system. In response to detecting that more free host physical memory is needed, the VMM 110 reclaims memory by deallocating chunks of physical host memory that are allocated to the VM disk cache 140. As shown, the VMM 110 selects a chunk 440 of the VM disk cache for reclamation. VMM 110 un-maps any cached guest data contained in that chunk 440 from the guest physical address space of the VM, after flushing any modified guest data to the physical storage device 108. VMM 110 then deallocates the chunk 440 of the VM disk cache from host physical memory, and the freed memory can be used for other purposes, such as the execution of another VM on the same host.

Figure 5:
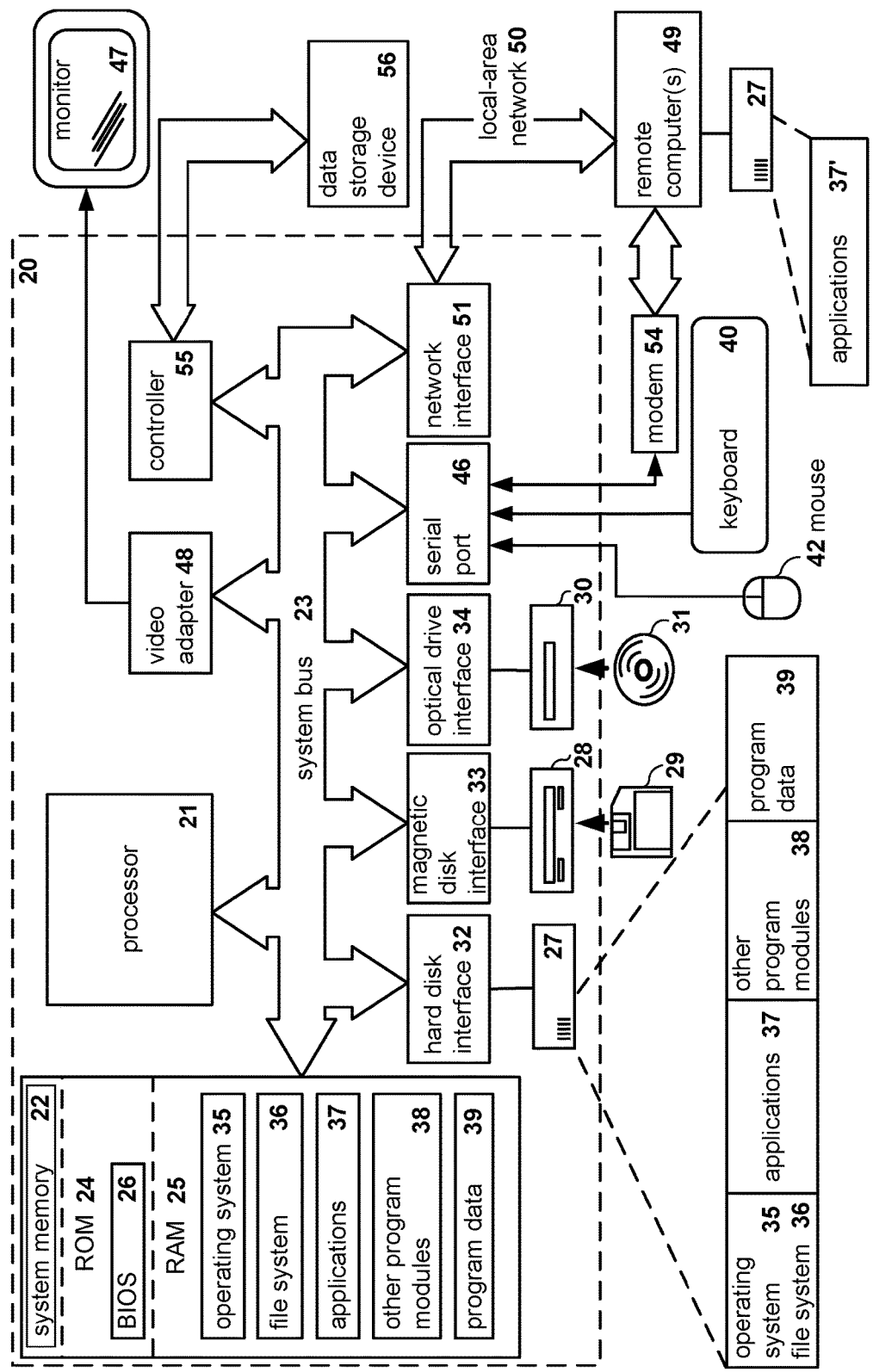
FIG. 5 illustrates a block diagram of an example of a general-purpose computer system on which the disclosed system and method can be implemented according to an exemplary aspect.

FIG. 5 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the host system 100 described above, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for managing computing resources of a physical server executing a plurality of virtual machines (VMs), the method comprising:
    executing, in a first virtual machine (VM) of the plurality of VMs, a guest block device driver configured to provide an interface to a memory-mapped virtual storage device;
    maintaining, by a virtual machine monitor, a disk cache associated with the virtual storage device, wherein the disk cache resides in a host physical memory of the physical server outside of portions of the host physical memory associated with guest physical memory of the first VM; and responsive to determining that available host physical memory satisfies a threshold condition, reclaiming a target portion of the host physical memory allocated to the disk cache.

2. The method of claim 1, wherein the memory-mapped virtual storage device occupies guest physical memory of the first VM.

3. The method of claim 1, wherein the disk cache is configured to store pages from a physical storage device of the physical server, and wherein the disk cache is shared between the plurality of VMs.

4. The method of claim 1, wherein maintaining by the virtual machine monitor the disk cache associated with the virtual storage device comprises:
intercepting, by the virtual machine monitor, a disk operation issued by the guest block device driver for the virtual storage device, wherein the disk operation comprises at least one of a read operation and a write operation.

5. The method of claim 4, wherein maintaining by the virtual machine monitor the disk cache associated with the virtual storage device further comprises:
mapping a portion of the disk cache into guest physical address space of the first VM; and
restarting the intercepted disk operation such that the disk operation runs natively on the virtual storage device.

6. The method of claim 1, wherein maintaining by the virtual machine monitor the disk cache associated with the virtual storage device comprises:
intercepting, by the virtual machine monitor, a read operation issued by the guest block device driver for data from a specified area in the virtual storage device;
retrieving the data from a physical storage device and storing the data in a portion of the disk cache;
mapping the portion of the disk cache into a guest physical address space of the first VM; and
restarting the intercepted read operation such that the read operation executes natively on the virtual storage device to read the data from the specified area in the virtual storage device that is mapped to the disk cache.

7. The method of claim 1, wherein maintaining by the virtual machine monitor the disk cache associated with the virtual storage device comprises:
intercepting, by the virtual machine monitor, a write operation issued by the guest block device driver for storing data to a specified area in the virtual storage device;
mapping a portion of the disk cache into guest physical address space of the first VM; and
restarting the intercepted write operation such that the write operation executes natively on the virtual storage device to write the data to the specified area in the virtual storage device that is mapped to the disk cache.

8. The method of claim 1, wherein reclaiming a target portion of the host physical memory allocated to the disk cache comprises:
responsive to determining that cached data contained in the target portion have been modified, (i) flushing the cached data to a physical storage device, and (ii) un-mapping the target portion from a guest physical address space of the first VM.

9. A system for executing a plurality of virtual machines (VMs), the system comprising:
a host physical memory; and
a hardware processor configured to:
execute, in a first virtual machine (VM) comprising a guest block device driver and a memory-mapped virtual storage device, wherein the guest device driver is configured to provide an interface to the memory-mapped virtual storage device;
maintain a disk cache associated with the virtual storage device, wherein the disk cache resides in the host physical memory outside of portions of the host physical memory associated with guest physical memory of the first VM; and
responsive to determining that available host physical memory satisfies a threshold condition, reclaim a target portion of the host physical memory allocated to the disk cache.

10. The system of claim 9, wherein the memory-mapped virtual storage device occupies guest physical memory of the first VM.

11. The system of claim 9, wherein the disk cache is configured to store pages from a physical storage device of the physical server, and wherein the disk cache is shared between the plurality of VMs.

12. The system of claim 9, where the processor configured to maintain the disk cache associated with the virtual storage device is further configured to:
intercept a disk operation issued by the guest block device driver for the virtual storage device, wherein the disk operation comprises at least one of a read operation and a write operation.

13. The system of claim 12, where the processor configured to maintain the disk cache associated with the virtual storage device is further configured to:
map a portion of the disk cache into guest physical address space of the first VM; and
restart the intercepted disk operation such that the disk operation runs natively on the virtual storage device.

14. The system of claim 9, wherein the processor configured to maintain the disk cache associated with the virtual storage device is configured to:
intercept a read operation issued by the guest block device driver for data from a specified area in the virtual storage device;
retrieve the data from a physical storage device and storing the data in a portion of the disk cache;
map the portion of the disk cache into a guest physical address space of the first VM; and
restart the intercepted read operation such that the read operation executes natively on the virtual storage device to read the data from the specified area in the virtual storage device that is mapped to the disk cache.

15. The system of claim 9, wherein the processor configured to maintain the disk cache associated with the virtual storage device is further configured to:
intercept a write operation issued by the guest block device driver for storing data to a specified area in the virtual storage device;
map a portion of the disk cache into guest physical address space of the first VM; and
restart the intercepted write operation such that the write operation executes natively on the virtual storage device to write the data to the specified area in the virtual storage device that is mapped to the disk cache.

16. The system of claim 9, wherein the processor configured to reclaim a target portion of the host physical memory allocated to the disk cache is further configured to:
responsive to determining that cached data contained in the target portion have been modified, (i) flush the cached data to a physical storage device, and (ii) un-map the target portion from a guest physical address space of the first VM.

17. A non-transitory computer readable medium comprising computer executable instructions for managing computing resources of a physical server executing a plurality of virtual machines (VMs), including instructions for:
  executing, in a first virtual machine (VM) of the plurality of VMs, a guest block device driver configured to provide an interface to a memory-mapped virtual storage device;
  maintaining, by a virtual machine monitor, a disk cache associated with the virtual storage device, wherein the disk cache resides in a host physical memory of the physical server outside of portions of the host physical memory associated with guest physical memory of the first VM; and
  responsive to determining that available host physical memory satisfies a threshold condition, reclaiming a target portion of the host physical memory allocated to the disk cache.

18. The non-transitory computer readable medium of claim 17, wherein the instructions for maintaining by the virtual machine monitor the disk cache associated with the virtual storage device comprises instructions for:
  intercepting, by the virtual machine monitor, a disk operation issued by the guest block device driver for the virtual storage device, wherein the disk operation comprises at least one of a read operation and a write operation.

19. The non-transitory computer readable medium of claim 18, wherein the instructions for maintaining by the virtual machine monitor the disk cache associated with the virtual storage device further comprises instructions for:
  mapping a portion of the disk cache into guest physical address space of the first VM; and
  restarting the intercepted disk operation such that the disk operation runs natively on the virtual storage device.

20. The non-transitory computer readable medium of claim 17, wherein the instructions for reclaiming a target portion of the host physical memory allocated to the disk cache further comprises instructions for:
  responsive to determining that cached data contained in the target portion have been modified, (i) flushing the cached data to a physical storage device, and (ii) un-mapping the target portion from a guest physical address space of the first VM.

* * * * *